United States Patent [19]
Kade et al.

[11] Patent Number: 5,320,421
[45] Date of Patent: Jun. 14, 1994

[54] MOTOR DRIVEN BRAKE PRESSURE MODULATOR WITH MOTOR POSITION CONTROL

[75] Inventors: Alexander Kade, Grosse Pointe Woods; Kevin G. Leppek, Rochester Hills, both of Mich.

[73] Assignee: General Motors Corporation, Detroit, Mich.

[21] Appl. No.: 926,424

[22] Filed: Aug. 10, 1992

[51] Int. Cl.$^5$ ................................................. B60T 8/58
[52] U.S. Cl. .................................. 303/100; 303/115.2
[58] Field of Search ............ 303/100, 102, 103, 115.1, 303/115.2, 15–17, 20; 364/426.2; 318/138, 254, 258, 439; 188/181 R, 181 A

[56] References Cited

U.S. PATENT DOCUMENTS

| | | | |
|---|---|---|---|
| 4,289,358 | 9/1981 | Dufft et al. | 303/100 |
| 4,665,350 | 5/1987 | Angi et al. | 318/254 |
| 4,822,114 | 4/1989 | Klein | 303/100 |
| 4,869,557 | 9/1989 | Gerum et al. | 303/15 |
| 4,909,577 | 3/1990 | Harrison et al. | 303/115.2 |
| 4,926,099 | 5/1990 | Ricker et al. | 318/254 |
| 4,941,553 | 7/1990 | Harrison | 303/115.2 |
| 4,986,614 | 1/1991 | Ricker et al. | 303/115 |

FOREIGN PATENT DOCUMENTS 0170478 5/1986 United Kingdom .

*Primary Examiner*—Robert J. Oberleitner
*Assistant Examiner*—Lee W. Young
*Attorney, Agent, or Firm*—Howard N. Conkey

[57] ABSTRACT

A multi-phased electrically commutated brushless DC motor driven brake pressure modulator includes a pressure actuator the position of which is controlled by the motor to establish the desired brake pressure. The movement of the actuator is determined by monitoring the motor rotation as represented by the output of the rotor position sensors used in commutation of the motor windings. The position of the actuator is represented by a counter value which is incremented or decremented in response to the output of the rotor position sensors and the direction of motor rotation. The counter value is related to the actuator position by presetting the counter value when the actuator in a known position such as a mechanical limit position. The known position is established by causing the motor to rotate in a direction to position the actuator toward the limit position until further outputs of the rotor position sensor are not sensed indicating the actuator is at its mechanical limit position.

3 Claims, 6 Drawing Sheets

MOTOR DRIVEN BRAKE PRESSURE MODULATOR WITH MOTOR POSITION CONTROL

BACKGROUND OF THE INVENTION

This invention relates to an electric motor driven brake pressure modulator for a motor vehicle braking system.

The use of motor driven pressure modulators in a vehicle braking system is known. For example, such use includes a motor driven braking pressure modulator in vehicle antilock braking systems. In these systems, the brake pressure is modulated by means of a DC torque motor driving a piston in a cylinder whose volume is modulated to control the hydraulic pressure at the wheel brake. In one such known system, the motor is controlled to position the piston in an initial, fully extended home position at which a check valve is unseated to couple the brake system master cylinder to the wheel brake to allow normal braking. When antilock brake pressure modulation is required, the motor retracts the piston (which allows a check valve to close to isolate the master cylinder from the wheel brake) to reduce brake pressure and thereafter modulates the piston position to provide pressure control for antilock braking. When antilock braking is no longer required, the motor returns the piston to its extended home position. Typically in these prior systems, the braking pressure is established based upon a relationship between a motor current, motor torque and the hydraulic pressure acting on the head of the piston. Motor current then becomes the controlled parameter to establish a desired braking condition via the brake pressure/motor current relationship.

The control of braking pressure in such systems wherein a brake pressure actuator is controlled by a motor may be substantially simplified by controlling the pressure based upon the position of the actuator controlled by the electric motor as opposed to motor current. This is because the functional relationship between position and pressure is substantially simpler than the functional relationship between motor current and pressure due to the motor dynamics. However, this would necessitate the addition of a position sensor on the actuator in order to establish the positional information.

SUMMARY OF THE INVENTION

This invention relates to a motor driven brake pressure modulator in which the position of a pressure actuator is controlled by the motor to establish the desired brake pressure. In accord with this invention, the position of the actuator is determined by monitoring the incremental rotation of the motor rotor from a reference actuator position.

In one aspect of the invention, the position of the actuator is represented by a counter value which is incremented and decremented based upon the direction and incremental rotation of the motor rotor. This invention provides for relating the counter value to the actuator position by presetting the counter value when the actuator is in a known position such as a mechanical limit position. The known position is established by causing the motor to rotate in a direction to position the actuator toward the limit position until further rotation of the motor rotor is not sensed indicating the actuator is at it's mechanical limit.

In accord with another feature of the invention, the motor is a multi-phased electrically commutated brushless DC motor and the incremental movement of the rotor is monitored by observing the output of the conventional rotor position sensors used in commutation of the motor windings.

DETAILED DESCRIPTION OF THE DRAWINGS

Figure 1:
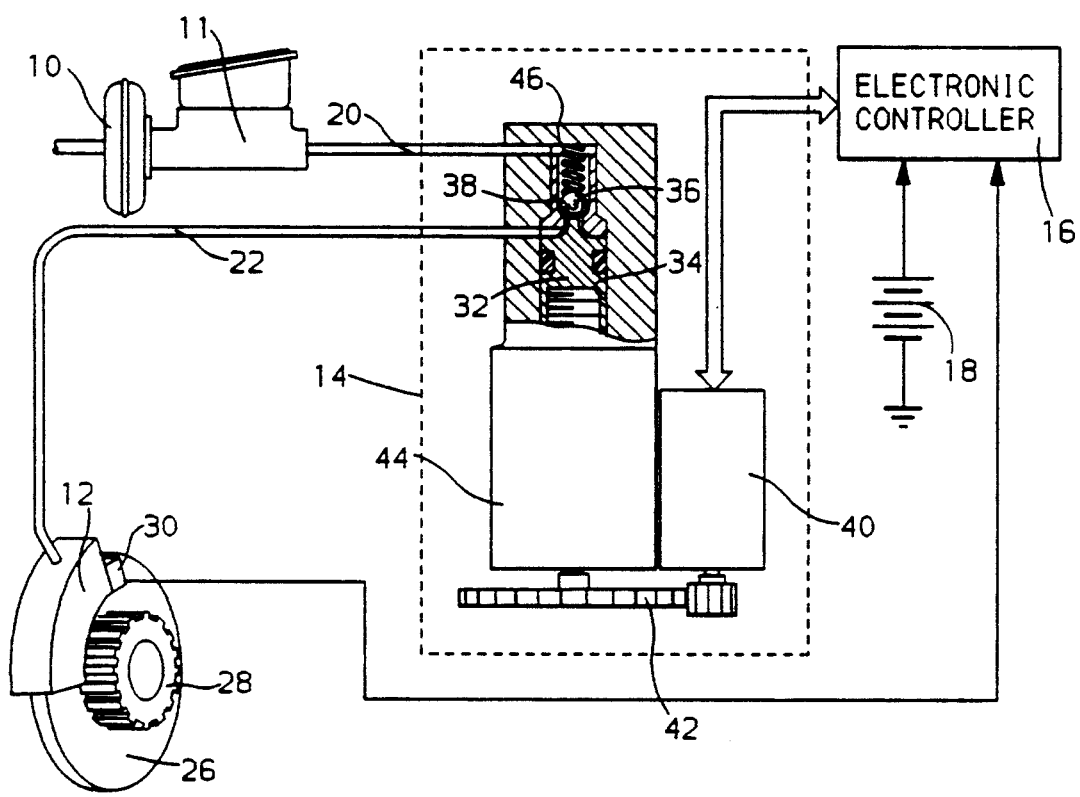
FIG. 1 is a diagram of a vehicle wheel braking system including a motor driven pressure modulator for limiting the wheel brake pressure for antilock brake control.

An electric motor driven antilock braking system incorporating the principles of this invention is generally depicted in FIG. 1. Referring to FIG. 1, the braking system comprises a hydraulic boost unit 10, master cylinder 11, a wheel brake 12 associated with one wheel of the vehicle, an electric motor driven hydraulic pressure modulator 14, and an electronic controller 16 for operating the modulator 14 with current from the vehicle storage battery 18. The master cylinder 11 develops hydraulic pressure in line 20 in relation to the force applied to an operator manipulated brake pedal, the line 20 being connected to the brake 12 via modulator 14 and brake line 22. The brake 12 is depicted as a disk brake caliper which develops braking force on the wheel rotor 26 in relation to the hydraulic pressure in the brake line 22. The wheel includes a wheel speed sensing assembly comprised of an exiter ring 28 rotating with the rotor 26 and therefore at the speed of the vehicle wheel and an electromagnetic sensor 30 which monitors the rotation of the exiter ring and provides a signal having a frequency proportional to the speed of the vehicle wheel. The wheel speed signal from the sensor 30 is provided to the controller 16.

The modulator 14 comprises a piston 32 axially displaceable in a modulator bore 34, a check ball 36 resiliently seated on a ball seat 38 disposed between the brake lines 20 and 22, and a bi-directional electric motor 40 coupled to to the piston 32 via a reduction gear-set 42 and a ball screw actuator 44 to control the axial displacement of piston 32.

Energization of the motor 40 is controlled by the electronic controller 16. When the controller 16 energizes the motor 40 for rotation in a forward direction, the ball screw actuator 44 extends the piston 32 into the bore 34. When extended soqs to engage the ⓔnd of the bore 34, the piston 32 functions to unseat the check ball 36. This opens the communication between brake lines 20 and 22, and represents the normal or quiescent state of the antilock brake system. When the controller 16 energizes the motor 40 for rotation in the opposite, or reverse, direction, the ball screw actuator 44 retracts piston 32 within the bore 34, permitting spring 46 to seat the check ball 36 on the ball seat 38, thereby isolating the brake line 22 from the brake line 20 and therefore the brake 12 from the master cylinder 11. In this condition, the brake fluid in line 22 back fills the modulator bore 34 as the piston 32 is retracted, relieving the fluid pressure developed at the brake 12. By controlling the motor 40, the pressure at the wheel brake 12 can therefore be modulated to controlled values less than the hydraulic pressure in brake line 20 until such time that the piston 32 is again extended to unseat the check ball 36 at which time the brake pressure output of the master cylinder is again communicated to the brake 12.

The antilock control system of FIG. 1 is operative at all times while the vehicle is in operation. It is necessary for normal vehicle braking via the master cylinder 11 for the modulator 14 to be in the home position illustrated in FIG. 1 with the check ball 36 being unseated from the seat 38. When so positioned, when the vehicle operator applies the vehicle brakes, the modulator 14 is in the passive or quiescent operating mode so that the hydraulic fluid passes through the brake line 20 and the check valve to the brake 12 thereby providing normal wheel braking.

Figure 2:
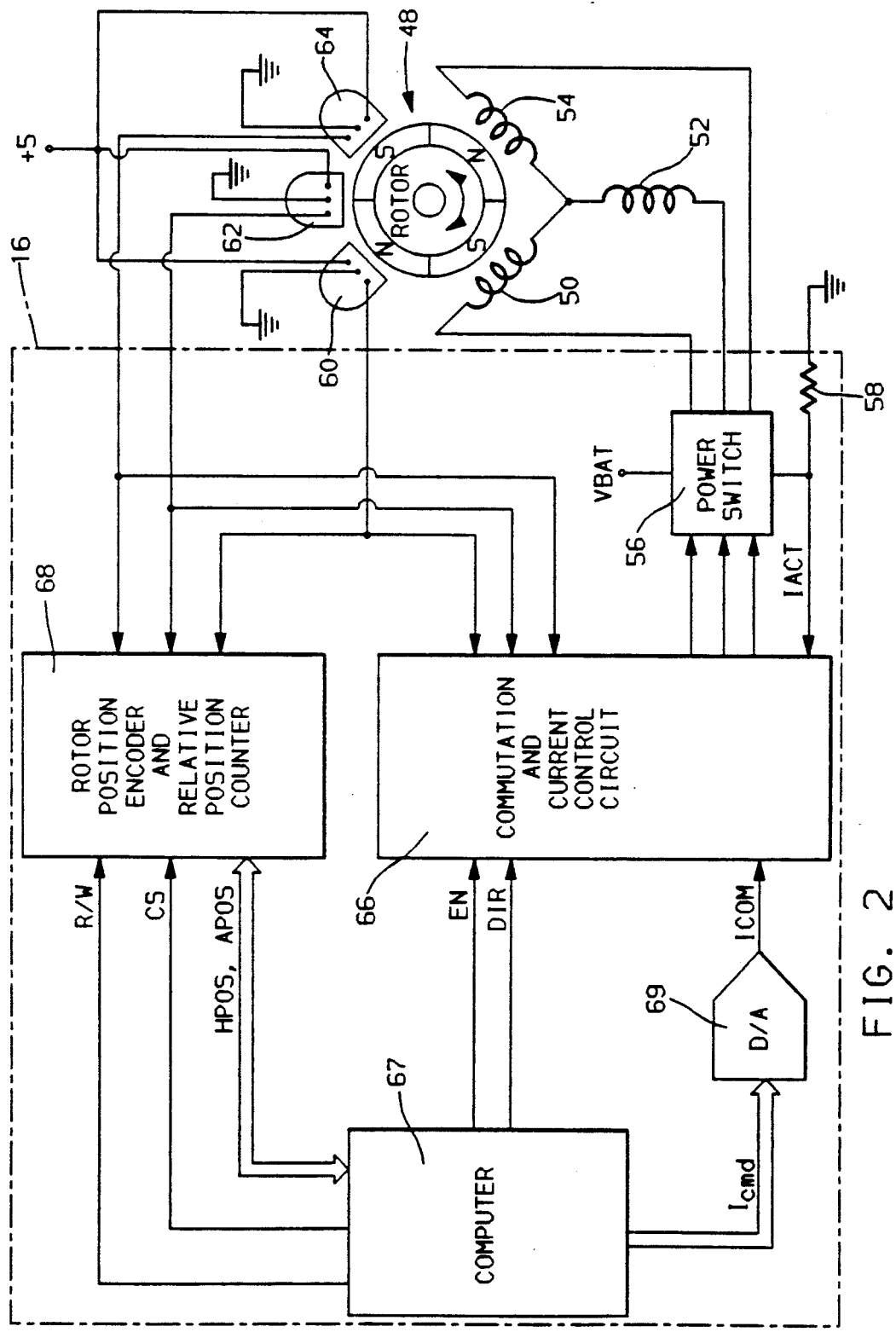
FIG. 2 is a diagram of a three phase brushless DC motor and the controller incorporating the principles of this invention.

Referring to FIG. 2, the DC motor 40 takes the form of a brushless electrically commutated DC motor comprising a four pole permanent magnet rotor 48 and three stator windings 50–54. The stator windings are connected in a Y configuration in which the windings are connected at one end to a common terminal and individually connected at their other ends to the output of a power switch 56 in the controller 16. The power switch 56 is comprised of a conventional full wave bridge cross which the voltage VBAT of the battery 18 is applied. Current through the power switch 56 and therefore the stator windings 50–54 of the motor 40 is sensed by a current sense resistor 58 the voltage across which represents the actual motor winding current IACT.

The motor 40 further includes conventional position sensors 60–64 in the form of Hall-effect sensors situated 60 electrical degrees apart in the magnetic field of the rotor 48 and which are utilized by a standard commutation and current control circuit 66 in the controller 16 to control the switches in the full wave bridge of the power switch 56 for commutating the phase windings 50–54.

The commutation and current control circuit 66 may take any known form such as a Unitrode UC1625 brushless motor controller chip. This circuit responds to an enable signal EN, a direction signal DIR and the position signals from the position sensors 60–64 for controlling the rotation and direction of the rotor 48. Further, the circuit 66 controls the current IACT in the stator windings 50–54, and therefore motor torque, to an input current command value ICOM. While any form of current control may be utilized, the preferred mode provides for a fixed frequency, pulse width modulation of the power switch 56 to regulate the sensed motor current IACT to the commanded motor current value ICOM. In one embodiment, an error voltage may be generated based upon the difference between the commanded current value ICOM and the actual current value IACT. The error signal is compared by a comparator to the level of a triangular wave signal to provide the duty cycle signal for controlling the power switch 56 to establish the commanded current ICOM. In another embodiment, in addition to this proportional control of the motor current, integral control may be provided to eliminate the error associated with solely proportional control.

In accord with this invention, to provide for antilock controlled braking, the controller 16 includes a computer 67 which executes an operating program permanently stored in memory to regulate the brake pressure applied to the wheel brake 12 in response to an incipient wheel lock condition by controlling the position of the piston 32 in the modulator 14. To monitor the position of the piston 32, the controller utilizes a rotor position encoder and relative position counter circuit 68 which tracks the movement of the piston 32 by means of a counter that counts in one direction (such as down) the state changes in the position sensors 60–64 when the rotor 48 is rotating in a direction retracting the piston 32 away from its home position and counts in the opposite direction (up in this example) when the rotor 48 is rotated in the direction extending the piston 32 towards its home position. In order to establish a known relationship between the count in the counter and the position of the armature 32, the counter is preset to a predetermined count when the piston is in a known position. This known position is the fully extended home position at which the piston 32 is seated at the limit position within the bore 34 at which it contacts the end of the bore 34. At this position, the check ball 36 is unseated by the piston 32 from the seat 38. Thereafter, by incrementing and decrementing this count based upon the state changes of the sensors 60-64 and the direction of rotation of the rotor 48, the counter tracks the position of the piston 32 relative to its home position.

According to the foregoing, the computer 67 provides for initializing the counter in the circuit 68 by commanding the commutation and current control circuit 66 to cause the motor 40 to rotate in direction to extend the piston 32 to the home limit position. This is accomplished by issuing the enable EN and direction DIR commands along with a current command Icmd to a digital-to-analog converter 70. The current command output ICOM of the converter 70 is then provided to the commutation and current control circuit 66. When the computer determines the piston 32 has reached its home position, the computer 67 presets the position counter in rotor position encoder 68 and relative position counter to a calibration home position value HPOS. Thereafter, the actual position of the piston 32 is tracked by the circuit 68 and provided upon command to the computer 67.

In accord with the operating program stored in memory, the computer 67 monitors the condition of the wheel via the wheel speed signal provided by the wheel speed sensor 30. When an incipient wheel lock condition is detected, the computer thereafter modulates the position of the piston 32 to regulate braking pressure to prevent a wheel lockup condition by determining a current command Icmd based upon the difference between a desired position and the actual position as provided by the circuit 68. This current command is provided to the digital-to-analog converter 69 which supplies the analog current command signal ICOM to the commutation and current control circuit 66 along with the direction DIR and enable EN signals to control the motor 40 to establish the desired position.

Figure 3:
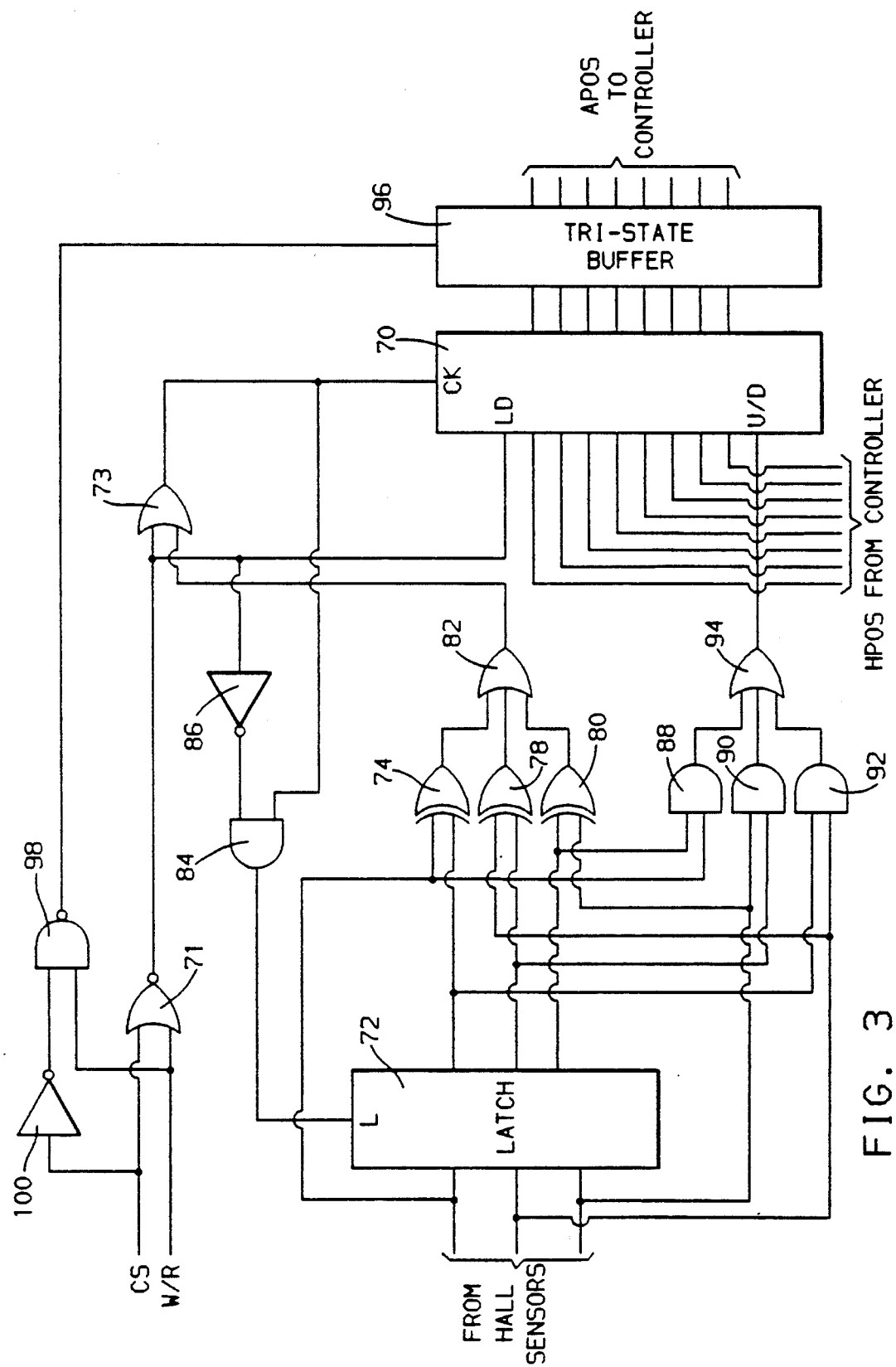
FIG. 3 is a circuit diagram of the rotor position encoder and relative position counter of FIG. 2.

Referring now to FIG. 3, there is illustrated the rotor position encoder and relative position counter 68. The count representing the position of the armature 32 is contained in an up/down counter 70. This counter is preset to a desired value by the computer 67 by applying the desired preset count such as the home position count HPOS to the inputs of the counter and then setting the chip select CS line and the read/write R/W inputs to a NOR gate 71 to the proper logic levels.

Thereafter, the counter 70 is either incremented or decremented based upon the output of the position sensors 60-64 and direction of rotation of the rotor 48 of the motor 40.

A change in the state of the position sensors 60-64 is sensed by a latch circuit 72 and a logic circuit comprised of EXCLUSIVE OR gates 74-80 whose outputs are coupled to an OR gate 82. In general, each of the EXCLUSIVE OR gates 74-80 compares the last latched state of one of the position sensors with the present state of the position sensor and if a difference is detected, the output of the respective EXCLUSIVE OR gate is a logic 1 which is coupled to the clock input of the counter 70 via the OR gate 82 and the OR gate 73.

Simultaneously with clocking the counter 70, the output of the OR gate 73 latches the new state of the position sensors 60-64 into the latch circuit 72 via an AND gate 84 as long as the computer 67 is not in the process of loading the counter 70 such that the output of an inverter 86 to the AND gate 84 is a logic 1. If the computer is in the process of presetting the counter 70, the logic 1 output of the NOR gate 72 applied to the inverter 86 functions to disable the AND gate 84 to inhibit latching of the output of the position sensors 60-64.

In accord with the foregoing, each time a change in the state of the position hall-effect sensors 60-64 changes states, the counter 70 is clocked by the output of the OR gate 82 via the OR gate 73. In order that the counter is clocked in direction according to rotation of the rotor 48, a quadrature detector comprised of AND gates 88-92 and OR gate 94 senses the direction of rotation of the rotor 48. Accordingly, when the rotor 48 is rotated in a direction retracting the armature 32 from the home position, the output of the quadrature detector circuit via OR gate 94 sets the counter 70 in a countdown mode such that each clock pulse from the OR gate 82 functions to decrement the count in the counter 70. Conversely, when the rotor is rotated in direction extending the piston 32 toward its home position, the output of the quadrature detector via the OR gate 94 sets the counter 70 in a countup mode such that each pulse output of the OR gate 82 in response to a change in the state of the position sensors 60-64 functions to increment the count in the counter 70. In this manner, once preset by the computer 67 as described above, the count in the counter 70 provides an indication of the position of the piston 32 relative to its fully extended position.

At any time the computer desires to read the actual position APOS of the piston 32, the CS and R/W lines are controlled to open a tristate buffer 96 via an AND gate 98 and inverter 100.

Figure 4:
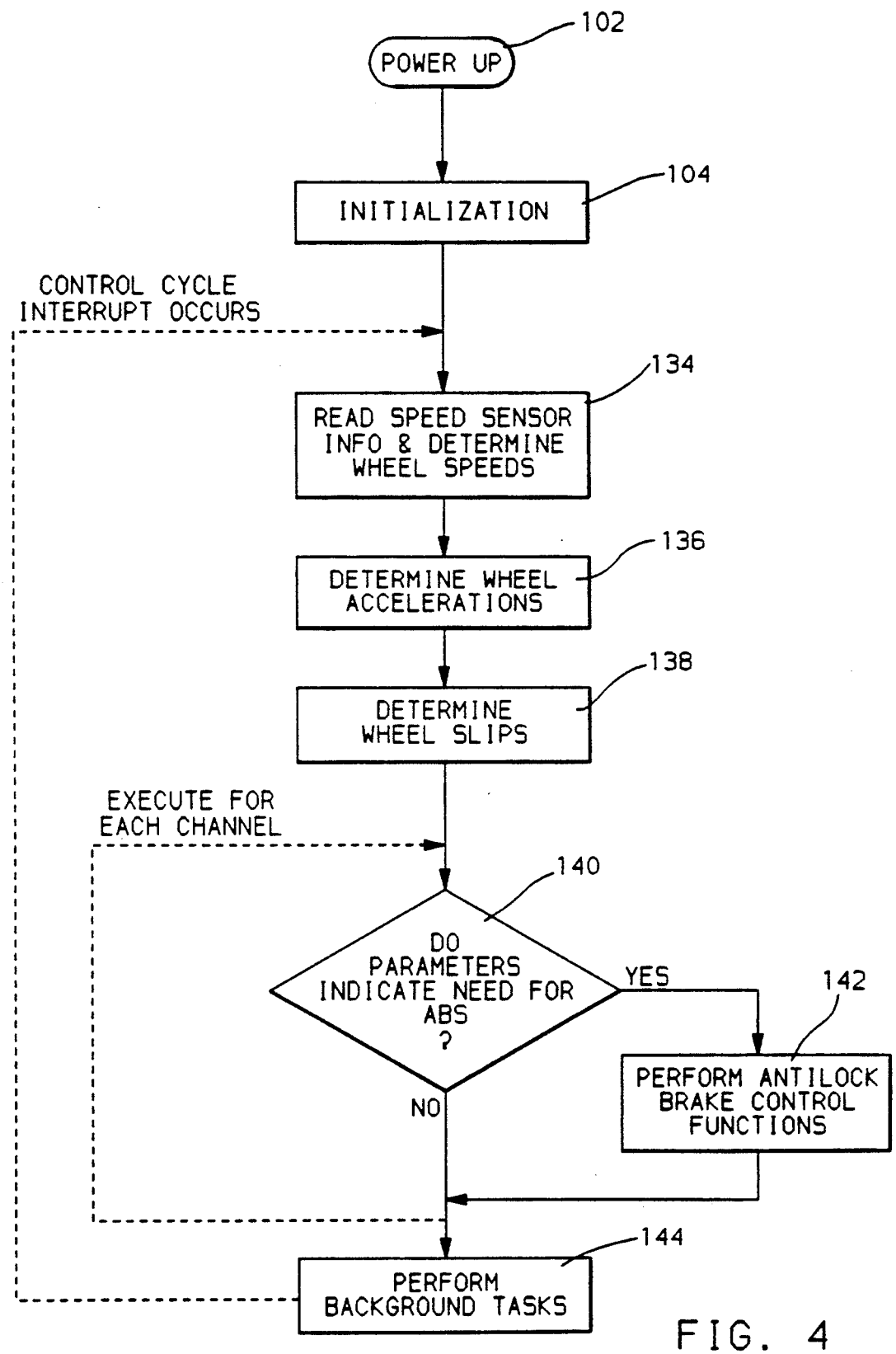
FIGS. 4, 5 and 6 are flow diagrams illustrating the operation of the controller of FIG. 1 in accord with the principles of this invention.

The computer 67 may take the form of a Motorola single chip microcomputer MC68HC11. This computer executes an operating program stored in a read only memory that contains the instructions necessary to implement the algorithm as set forth in FIGS. 4-6. Referring first to FIG. 4, when power is first applied to the system from the vehicle battery 18 such as when a conventional vehicle ignition switch is rotated to its on position, the computer program is initiated at point 102 and then proceeds to execute an initialization routine at step 104 which, in addition to the normal initialization steps of clearing registers, initializing various random access memory variables to calibrated values and other functions, a rehome routine is executed to establish the known relationship between the count in the counter 70 of FIG. 3 and the position of the piston 32 so that the system may thereafter track the position of the piston relative to its fully extended home position. Without this known relationship, it would not be possible for the computer 67 to know the position of the piston 32 in the bore 34. Without this information, intelligent control of the pressure for antilock brake pressure regulation based on position would not be possible.

Figure 5:
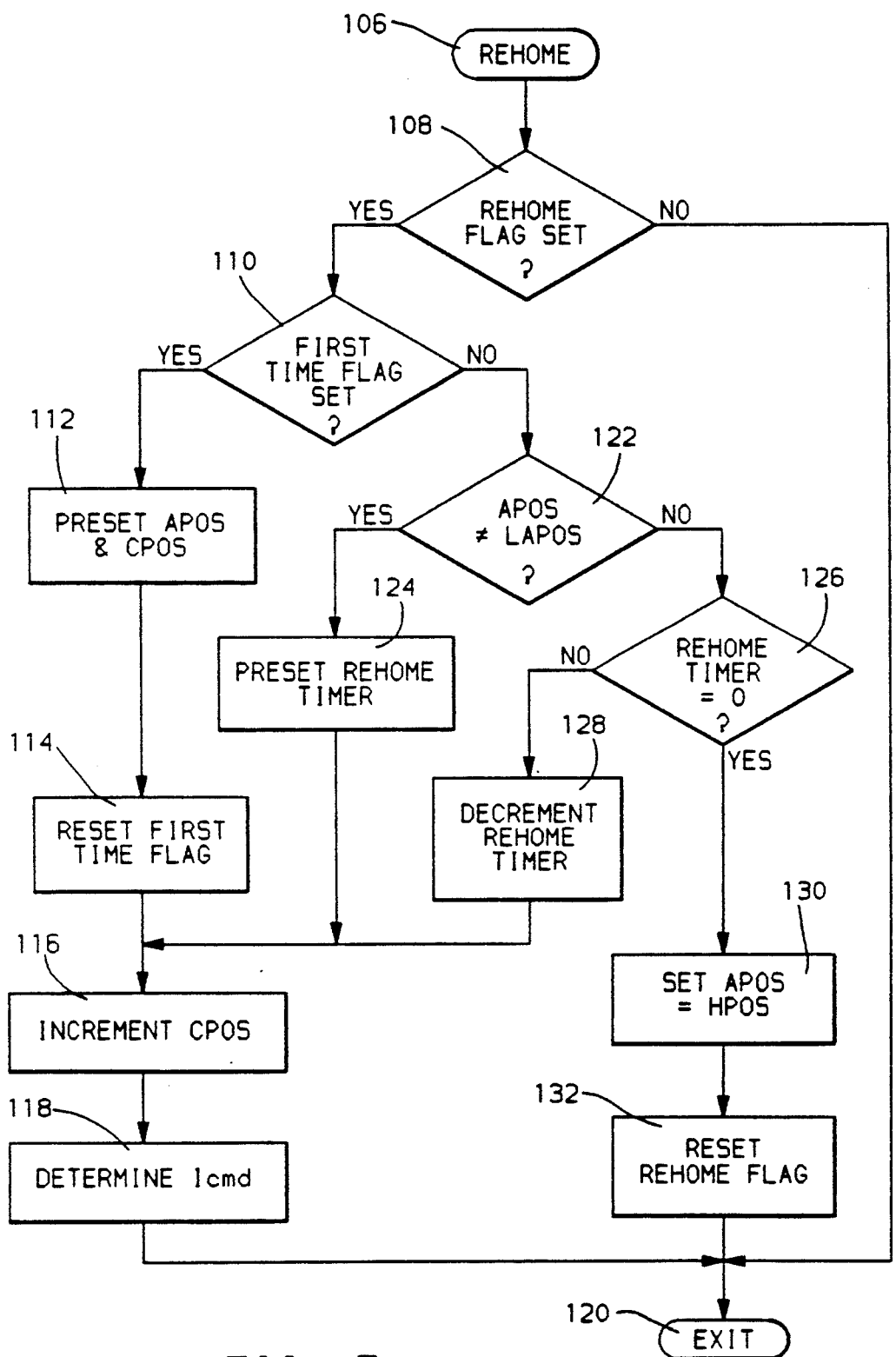

Referring now to FIG. 5, the rehome routine to establish the known relationship between the piston 32 position and counter 70 count is illustrated. This routine is entered at point 106 and then proceeds to sample the state of a rehome flag at step 108. This flag is initially in a set condition indicating that the routine has not yet completed the rehome routine. Accordingly, assuming that the flag is set, the program proceeds to sample the state of a first time flag at 110. This flag indicates that the rehome routine is being executed for the first time since the power up of the system. If it is the first time, it is desirable to preset both the actual position count APOS in the counter 70 and a commanded position count CPOS both to a minimum count value. This is accomplished via step 112 where the counter 70 is preset to the minimum count value in the manner previously described in reference to FIG. 3. The commanded position CPOS is also set to this minimum value at step 112. The first time flag is reset at step 114 causing step 112 to be bypassed during subsequent executions of the rehome routine.

Following step 114, the commanded position count CPOS is incremented at step 116. The routine then determines a current command value Icmd based upon the difference between the commanded position CPOS of the piston 32 and the actual position APOS resident in the counter 70. In one embodiment, the current command ICOM determined at step 118 is an amount having a proportional relationship to the position error. In another embodiment, an integral term based upon the error may also be summed with this proportional term to establish the final current command Icmd provided to the digital-to-analog circuit 70 of FIG. 2. As previously described in relation to FIG. 2, the resulting current command ICOM output of the digital-to-analog converter 70 is provided to the commutation and current control circuit 66 which establishes a current value in the motor windings according to the commanded value.

Following step 118, the program exits the rehome routine at step 120. The routine of FIG. 5 is thereafter re-entered on a time interrupt basis and repeated until the rehome function has been completed as will be indicated by a reset condition of the rehome flag.

Returning now to step 108, during the second and subsequent executions of the rehome routine, the program proceeds from step 108 and step 110 to a step 122 where the actual position APOS represented by the count output of the counter 70 is sampled and compared to the last actual position LPOS determined during the prior execution of the routine. If the piston is moving in response to the current command indicating that the piston has not yet reached the physical limit position where it engages the end of the bore 34, the step 122 will detect a change in position represented by the inequality of APOS and LAPOS. Assuming this condition, a rehome timer is preset to a predetermined value at step 124. In general, the routine requires the piston to be stationary for a predetermined time represented by the preset value before it is assumed that the armature has been fully moved to its extended position. Thereafter, the commanded position CPOS is again incremented and a current command Icmd is determined at step 118 based upon the resulting error in the actual and commanded position.

The foregoing steps 108, 110, 122, 124, 116 and 118 are repeatedly executed at the time interrupt interval until such time that step 122 indicates that the present and last positions of the piston 32 (represented by the last and present counts from the counter 70) are equal. When this condition is sensed, the rehome timer is sampled at step 126. If not zero, the timer is decremented at step 128 after which the commanded position is again incremented at step 116 and a new current command value established based upon resulting error at step 118. Whenever step 126 determines that the rehome timer has been decremented to zero indicating that the piston 32 has been stationary for the required period of time indicating it has been moved to its fully extended position, the routine proceeds to a step 130 where the count in the counter 70 is preset to the predetermined home position count HPOS representing the position of the piston 32 in the fully extended limit position. When preset to this value, the count in the counter 70 thereafter has a predetermined known relationship to the actual position of the piston 32 as it is moved in the bore 34 via operation of the motor 40. With this knowledge, intelligent control of the pressure applied to the wheel brakes 12 for antilock brake control may be established based on a direct correlation between brake pressure and piston 32 position.

When the preset step 130 has been executed, the rehome flag is then reset at step 132 so that during subsequent executions of the initialization routine, the rehome routine is bypassed via step 108.

When the initialization routine 104, which may include various other routines, is completed, the program proceeds to perform antilock brake control functions as required. These antilock control functions are performed by executing a control cycle in response to each of repeated control cycle interrupts which are generated at a predetermined fixed time interval such as 5 milliseconds. Upon the occurrence of a control cycle interrupt, the digital computer 67 begins executing the functions embodied in the control cycle. First, at step 134, wheel speed sensor information is read and wheel speed is computed for each of the vehicle wheels. In this respect, it is understood that while the system illustrated in FIG. 1 shows a single channel for antilock brake control, multiple channels such as 2, 3 or 4 channels may be provided as required for the particular application. For example, a separate modulator 14 may be provided for each front wheel and a single modulator may be provided for the combined rear wheels for antilock brake control. The computer 67 will have associated with it a rotor position encoder and relative position counter 68, a commutation and current control circuit 66, a power switch 58 and a converter 69 for each of the wheel brake channels.

Thereafter, individual wheel accelerations are determined at step 136 and individual wheel slip values are determined at step 138. The routine next executes once for each braking channel (where each channel includes a modulator 14) a step 140 to determine whether the parameters for the selected channel indicate an incipient wheel lockup condition requiring entry into antilock brake pressure regulation and, if such a need is indicated, an antilock brake control function routine 142. For a four channel system, this requires the steps 140 and 142 to be executed four times, once for each channel with its related wheel parameters as determined via steps 134–138.

Step 140 determines from a lookup table stored in read only memory whether or not antilock controlled braking is required based upon a predetermined schedule that is a function of wheel acceleration and wheel slip. The table establishes a boundary condition such that when the combination of acceleration and wheel slip indicate an incipient wheel lockup condition, a need for antilock controlled braking is indicated. If step 140 does not indicate such an incipient wheel lockup condition, the routine then continues for the next channel. However, if step 140 determines via the lookup table that an incipient wheel lockup condition exists, the program then proceeds to execute an antilock brake control routine 142 as illustrated more specifically in FIG. 6.

Figure 6:
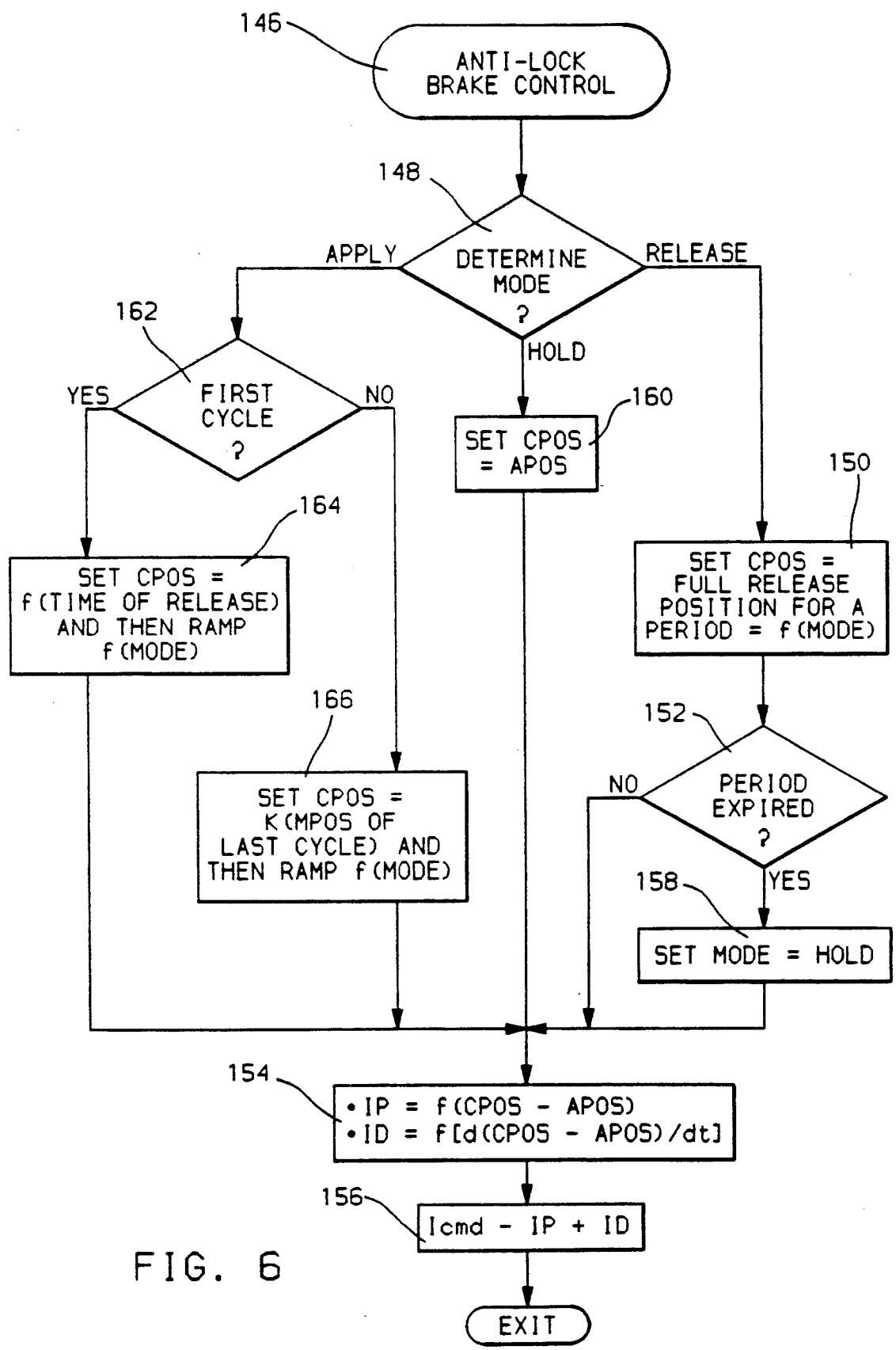

Referring now to FIG. 6, the antilock brake control routine is entered at step 146 and proceeds to determine the braking mode at step 148. In general, the selection is made from (A) a number of release modes, such as 3, each having associated with it a specific pressure release and pressure hold periods, (B) a number of apply modes, such as 3, each having a related rate of increase in brake pressure, and (C) a pressure hold mode. Step 148 further provides for an initial release mode providing the most aggressive release of brake pressure. Accordingly, when a release mode is indicated at step 148 in response to an incipient wheel lockup condition, the routine proceeds to a step 150 where the commanded position CPOS of the piston 32 of the associated wheel brake modulator 14 is set to a full release position for a predetermined period that is a function of the particular release mode. For the initial release mode, step 150 may provide for the most aggressive release by establishing the longest period of release represented by a predetermined number of control cycle interrupt intervals. Release periods corresponding to the release mode are otherwise provided. The step 152 then determines whether or not the period that the commanded position is established at the fully retracted position of the piston 32 has expired. If not, the program proceeds directly to a step 154 where a proportional current control term IP is determined as a predetermined function of the position error represented by the difference between the commanded position CPOS and the actual position APOS obtained from the counter 70 of FIG. 3. Also at step 154 a derivative current command term IP is determined as a predetermined function of the rate of change in position error. The final current command value Icmd is determined at step 156 as the sum of the proportional and derivative current control terms. This value is then provided to the corresponding digital-to-analog converter 70 for controlling the modulator 14 associated with the selected wheel.

Returning to step 152, when the routine determines that the period of release for the selected wheel has expired, the mode is set to a hold mode at step 158 with a hold period identified based upon, for example, the particular release mode determined at step 148. Thereafter, at step 148 for selected wheel, a hold mode is executed for a predetermined number of interrupt cycles by freezing the commanded position CPOS at the actual position of the armature 32 represented by the output of the counter 70.

When the step 148 determines an apply mode such as when wheel slip and acceleration indicate the wheel has recovered from the incipient wheel lock condition, a step 162 determines if this is the first cycle of antilock brake control since step 140 initiated antilock controlled braking. If so, the commanded position CPOS is set equal to a value that is a predetermined function of the time of pressure release after which the commanded position CPOS is ramped at rate that is a function of the particular apply mode determined by step 148. In the preferred embodiment, the ramp rate of brake pressure is controlled by varying the period of ramp rather than the size of the change in the commanded position CPOS. This maximizes the position resolution by allowing the step size of the commanded position to always be a small value.

If step 162 determines that this is not the first antilock brake pressure control cycle, a step 166 is executed to establish the commanded position for apply. At step 166, the commanded position of the piston 32 is initialized to a predetermined substantial fraction of the maximum position of the piston during the previous cycle. The maximum position represents maximum brake pressure corresponding in time to the step 148 first indicating a release mode. This piston position (brake pressure) represents the pressure substantially corresponding to the maximum braking force for the vehicle wheel. By setting the commanded position CPOS at a predetermined fraction of the maximum position during the prior cycle, the brake pressure is quickly established at a pressure substantially at the pressure producing a maximum braking force between the tire and the road surface. In another embodiment, the initial commanded position established via step 166 may be based upon the release distance and the difference between the actual and commanded positions of the piston at the time of release. Thereafter, via repeated executions of the step 166 for the selected wheel, the commanded position CPOS is incremented in the same manner as previously described in relation to step 164 to establish a ramp rate that is a function of the apply mode determined at step 148. The resulting current command is established as previously described via steps 154 and 156. Through repeated executions of the routine of FIG. 6, the position of the armature 36 is continually modulated to modulate the wheel brake pressure for antilock controlled braking to prevent wheel lockup.

The routine of FIG. 6 is repeated for each braking channel as previously described. Following execution of the steps 140 and 142 (if applicable) for each braking channel, the routine then proceeds to step 144 where background tasks are performed until the receipt of the next control cycle interrupt at which time the steps 134 through 142 are repeated as described.

The foregoing antilock brake control system provides for control of brake pressure based upon the position of a pressure actuator, such as the piston 32, wherein the position is tracked based on the output of position sensors used in the commutation of a brushless motor controlling the actuator position. Further, the counter utilizing the output of those position sensors for tracking the position of the pressure actuator is preset to a predetermined count to establish a known relationship between the count and the position of the pressure actuator when the actuator is driven to a known position.

The foregoing description of a preferred embodiment of the invention for purposes of illustrating the invention is not to be considered as limiting the invention since many modifications may be made by the exercise of skill in the art without departing from the cope of the invention.

The embodiments of the invention in which an exclusive property or privilege is claimed are defined as follows:

1. A method of controlling the brake pressure applied to the brake of a vehicle wheel traveling over a road surface in a vehicle braking system having a pressure modulator including a motor and an actuator moved by the motor in response to motor rotation to control brake pressure, the actuator having a home position whereat the actuator is at a physical limit of travel, the method comprising the steps of:

generating a position signal for each predetermined increment of motor rotation;

incrementing a count value APOS in response to each position signal when the motor is rotating in a first direction;

decrementing the count value APOS in response to each position signal when the motor is rotating in a second direction;

initializing the count value by (A) controlling the motor to move the actuator toward the home position, (B) determining when no position signals are being generated while the motor is being controlled to move the actuator toward the home position as an indication the actuator is in the home position and (C) presetting the count value to a predetermined value HPOS when the actuator is indicated in the home position;

determining a command count value CPOS representing a command position of the actuator relative to the value HPOS to establish a desired brake pressure condition; and controlling the motor to establish the count value APOS equal to the command count value CPOS.

2. A system for controlling the brake pressure applied to the brake of a vehicle wheel traveling over a road surface, the system comprising, in combination:

a pressure modulator including a motor and an actuator moved by the motor in response to motor rotation to control brake pressure, the actuator having a home position whereat the actuator is at a physical limit of travel;

means for generating a position signal for each predetermined increment of motor rotation;

a counter having a count value APOS stored therein;

means for incrementing the count value APOS in response to each position signal when the motor is rotating in a first direction;

means for decrementing the count value APOS in response to each position signal when the motor is rotating in a second direction;

means for initializing the count value APOS, the means for initializing the count value APOS including means for controlling the motor to move the actuator toward the home position, means for determining when no position signals are being generated while the motor is being controlled to move the actuator toward the home position as an indication the actuator is in the home position and means for presetting the count value APOS to a predetermined value HPOS when the actuator is indicated in the home position;

means for sensing an incipient wheel lockup condition;

means for determining a command count value CPOS representing a command position of the actuator relative to the value HPOS in response to a sensed incipient wheel lockup condition; and means for controlling the motor to establish the count value APOS equal to the command count value CPOS.

3. A system for controlling the brake pressure applied to the brake of a vehicle wheel traveling over a road surface, the system comprising, in combination:

a pressure modulator including an electrically commutated brushless DC motor having a rotor, a plurality of phase windings, and position sensors for generating a coded rotor position signal that changes states for each predetermined incremental rotation of the rotor and an actuator moved by the motor in response to rotation of the rotor to control brake pressure, the actuator having a home position whereat the actuator is at a physical limit of travel;

means for commutating the motor phase windings in response to the rotor position signal as the rotor is rotated;

means responsive to the coded rotor position signal for determining one of first and second directions of rotation of the rotor;

means for generating a clock signal at each change in the state of the coded rotor position signal;

a counter having a selectable countdown mode, a selectable countup mode and count value APOS stored therein, the counter being responsive to the clock signal for incrementing the count value APOS when the countup mode is selected and decrementing the count value APOS when the countdown mode is selected;

means for selecting the countdown mode of the counter in response to a determined first direction of rotation of the rotor;

means for selecting the countup mode of the counter in response to a determined second direction of rotation of the rotor;

means for initializing the count value APOS, the means for initializing the count value APOS including means for controlling the motor to move the actuator toward the home position, means for determining when no clock signals are being generated while the motor is being controlled to move the actuator toward the home position as an indication the actuator is in the home position and means for presetting the counter count value APOS to a predetermined value HPOS when the actuator is indicated in the home position;

means for sensing an incipient wheel lockup condition;

means for determining a command count value CPOS representing a command position of the actuator relative to the value HPOS in response to a sensed incipient wheel lockup condition; and means for controlling the motor to establish the count value APOS equal to the command count value CPOS.

* * * * *